United States Patent [19]

Harston et al.

[11] Patent Number: 5,177,930
[45] Date of Patent: Jan. 12, 1993

[54] CARTON FORMING APPARATUS WITH SERVO CONTROL

[75] Inventors: John C. Harston; Brian C. Pike, both of Avon, England

[73] Assignee: Kliklok Corporation, Decatur, Ga.

[21] Appl. No.: 761,857

[22] PCT Filed: Mar. 7, 1990

[86] PCT No.: PCT/US90/01241
§ 371 Date: Sep. 10, 1991
§ 102(e) Date: Sep. 10, 1991

[87] PCT Pub. No.: WO90/10535
PCT Pub. Date: Sep. 20, 1990

[30] Foreign Application Priority Data

Mar. 10, 1989 [GB] United Kingdom ............... 8905530

[51] Int. Cl.$^5$ .................... B31B 1/74; B31B 3/46; B65B 57/06
[52] U.S. Cl. ........................... 53/55; 53/506; 53/563; 493/167
[58] Field of Search .............. 53/55, 56, 57, 58, 506, 53/505, 77, 207, 462, 563; 493/167

[56] References Cited

U.S. PATENT DOCUMENTS

| 3,260,174 | 7/1966 | Pierce | 493/171 X |
| 3,955,482 | 5/1976 | Moen. | |
| 4,722,168 | 2/1988 | Heaney | 53/55 X |
| 4,930,290 | 5/1990 | Barker | 53/207 X |
| 4,955,176 | 9/1990 | Seko et al. | 53/55 X |
| 5,010,712 | 4/1991 | Odenthal | 53/55 |

FOREIGN PATENT DOCUMENTS 1262888  4/1961  France.

Primary Examiner—James F. Coan
Attorney, Agent, or Firm—King & Schickli

[57] ABSTRACT

An apparatus for forming paperboard cartons from flat blanks is provided. The carton blanks are fed from a magazine to the face of a forming die, a reciprocating plunger is provided to push the blank through the die forming the carton, and an endless conveyor receives the carton after being stripped from the bottom of the die. A servo drive means for the plunger, blank feeder and conveyor are each independently driven by an infinitely variable speed electric motor. A programmable logic controller operates the servo drive means, whereby the plunger, feeder and conveyor can be infinitely varied to fit the forming action desired. The servo drive means preferably takes the form of a variable speed, electronic servo motor including an encoder and a tachometer feedback. Product sensor means detect product availability and carton sensor means detects carton availability with both sensor means also being controlled by the programmable logic controller.

10 Claims, 3 Drawing Sheets

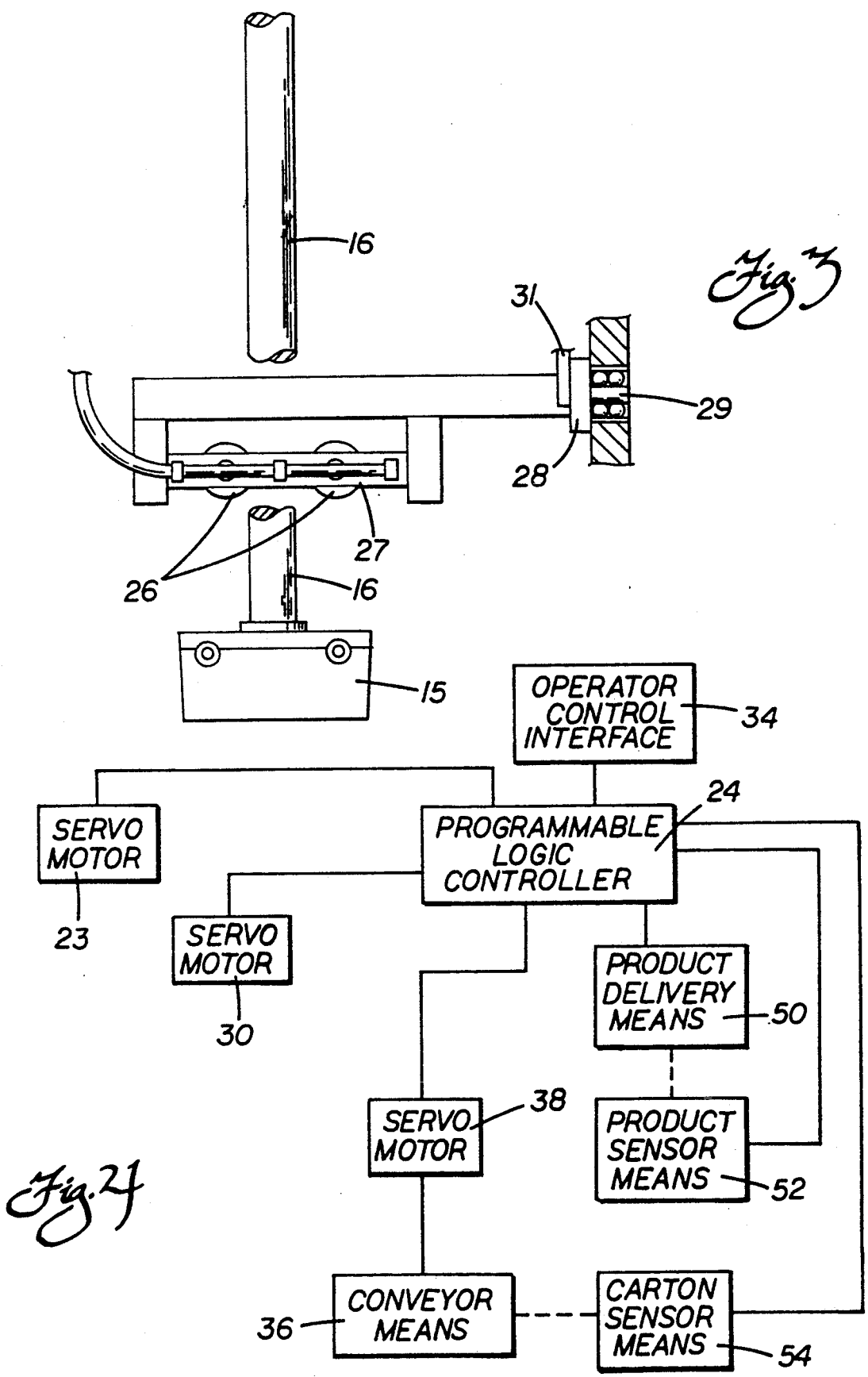

CARTON FORMING APPARATUS WITH SERVO CONTROL

BACKGROUND OF THE INVENTION

This invention relates to packaging machinery of the type in which a paperboard carton is first formed from a flat paperboard blank by a plunger reciprocating through a forming die, the formed carton with open top being stripped from the retracting plunger and deposited on to a conveyor system at another position along which a product is delivered into the carton, which then receives a separate lid at a further position or has integral flaps folded down and secured.

With the usual cyclical mechanical drive for the plunger in the prior art carton formers, the timing for the blank feeder, and the conveyor system and product delivery, is all set from the timing of the plunger. Also, the motion of the plunger is rigidly determined by the drive means. Even if the length of stroke of the plunger can be adjusted, it is unlikely to vary its speed curve, which is usually sinusoidal with a maximum speed at or near to its passage through the forming die. This prior art packaging machinery is illustrated, for example, in applicant's U.S. Pat. No. 3,260,174 issued Jul. 12, 1966. Except for refinements in a few of the mechanical drive components, there have been no significant changes in this basic drive and control system in the last 25 years.

OBJECTS OF THE INVENTION

One object of the invention is to provide improved drive means for the plunger allowing for a wide variety in the motion of the plunger, such as its stroke, speed curve, or interrelated timing, to be preset.

Another object is to provide improved blank feeder means also allowing for variety in the motion and very accurate positioning of the blank over the forming die.

A further object is to provide programmable control means for the plunger drive means and the blank feeder means whereby their interrelated timing can be adjusted to maximize speed of operation.

Yet another object is to provide improved conveyor drive means also subject to programmable control for precise timing of propelling flights on the conveyor with formed cartons deposited from the die.

A still further object is to provide product delivery means likewise subject to programmable control, by means of a product/carton sensor not only for precise timing of product into a carton, but also to withhold product in the event that a carton is missing from the sequence on the conveyor.

Likewise, an object of the invention is also to provide a product sensor means associated with the conveyor so that a carton blank is not fed to the die in the event that no product will be available to be delivered into the said carton.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

SUMMARY OF THE INVENTION

According to a first aspect of the invention, a carton former comprises a forming die having carton blank supporting surfaces adjacent an upper entry end, a magazine for flat carton blanks, feeder means for extracting a leading blank from the magazine and depositing it on the supporting surfaces of the forming die, a plunger reciprocally through the forming die to push the blank through the die to form a carton, stripping means at a lower exit end of the forming die, a servo drive means for effecting reciprocation of the plunger, and a controller (such as a programmable logic controller) coupled with the servo drive means for determining at least the stroke and speed of the plunger.

Thus, the controller can be used to program the servo drive means so that it effects a rapid approach of the plunger to a carton blank on the supporting surfaces of the forming die, effects a rapid slowing of the plunger before contact with the carton blank, speeds up again as entry into the forming die proceeds, maybe effecting a temporary stop or "hold" of the formed carton in the forming die to set its folds, and effects a very fast return of the plunger (after stripping of the formed carton from it below the forming die) to bring the plunger back far enough above the forming die for feeding of the next carton blank from the magazine to the forming die.

The plunger is conveniently carried by the lower end of a vertical shaft slidably but non-rotatably mounted in a pair of spaced guides, and the upper end of the shaft may be connected to a hydraulic or pneumatic piston or a linear motor adapted as the servo drive means, or a recirculating ball or roller screw on a rotatable shaft may be driven by a programmable reversible motor or by a stepping motor. To save on height, the shaft may have secured to it, a lateral arm intermediate the spaced guides and the lateral arm is also secured to a chain or gear-belt trained around sprockets, one of which is driven by a standard servo motor with an encoder/tachometer feedback, and the sprocket driven by the servo motor is preferably on an axis parallel to but horizontally offset from the lower of a pair of sprockets between which extends a vertical run of the chain or gear-belt to which the lateral arm is secured.

The carton blank feeder means preferably comprises at least one suction cup (but preferably two or more suction cups) carried by an arm secured on a horizontal shaft enabling the suction cup (or cups) to be swung between the magazine and a position just above the supporting surfaces of the forming die, and a servo motor for oscillating the shaft, for example, through a chain or gear-belt and sprockets, the servo motor also being coupled with the controller, to enable the timing and extent of swing of the suction cup (or cups) to be optimized.

A programmable logic controller preferably has an operator control interface including a control and display panel enabling ready adjustment of plunger stroke and speed, blank feeder swing and timing, and conveyor operation to be effected and displayed.

The conveyor system may comprise one or more conveyor chains with flights for propelling the formed cartons in succession to product delivery means of one or more production machines and carton closing means, and each conveyor chain may be driven by a servo motor coupled to the controller, to enable the timing of the flights past the lower exit end of the folding dies in coordination with the stripping of formed cartons from the plunger.

Alternatively, the conveyor system may comprise one or more flight-less belts, and each belt may be driven by a servo motor coupled to the controller. Programmable control may also be used with walking beam conveyors, and also with starwheels and "pick-and-place" mechanisms associated with conveyors.

Product delivery means may be subject to programmable control by the controller, both to effect timing of product delivery with formed cartons passing along the conveyor system, and also preferably to withhold product in the event that a carton is missing from the sequence on the conveyor system, in which case carton detector means is provided at an intermediate position along the conveyor system and is coupled to the controller.

Likewise, detector means for product is preferably provided in advance of the product delivery means and coupled to the controller, to ensure that a carton blank is not fed to the forming die in the event that no product will be available to be delivered into the said carton.

Still other objects of the present invention will become readily apparent to those skilled in this art from the following description wherein there is shown and described a preferred embodiment of this invention, simply by way of illustration of one of the modes (and alternative embodiments) best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

An embodiment of carton former in accordance with the invention, with associated blank feeder means and conveyor, will now be described, by way of example only, with reference to the accompanying diagrammatic drawings, in which:

FIG. 3 is a fragmentary part-sectional elevation taken from the line III—III in FIG. 2; and FIG. 4 is a schematic diagram of the control circuit.

DETAILED DESCRIPTION OF THE INVENTION

Figure 1:
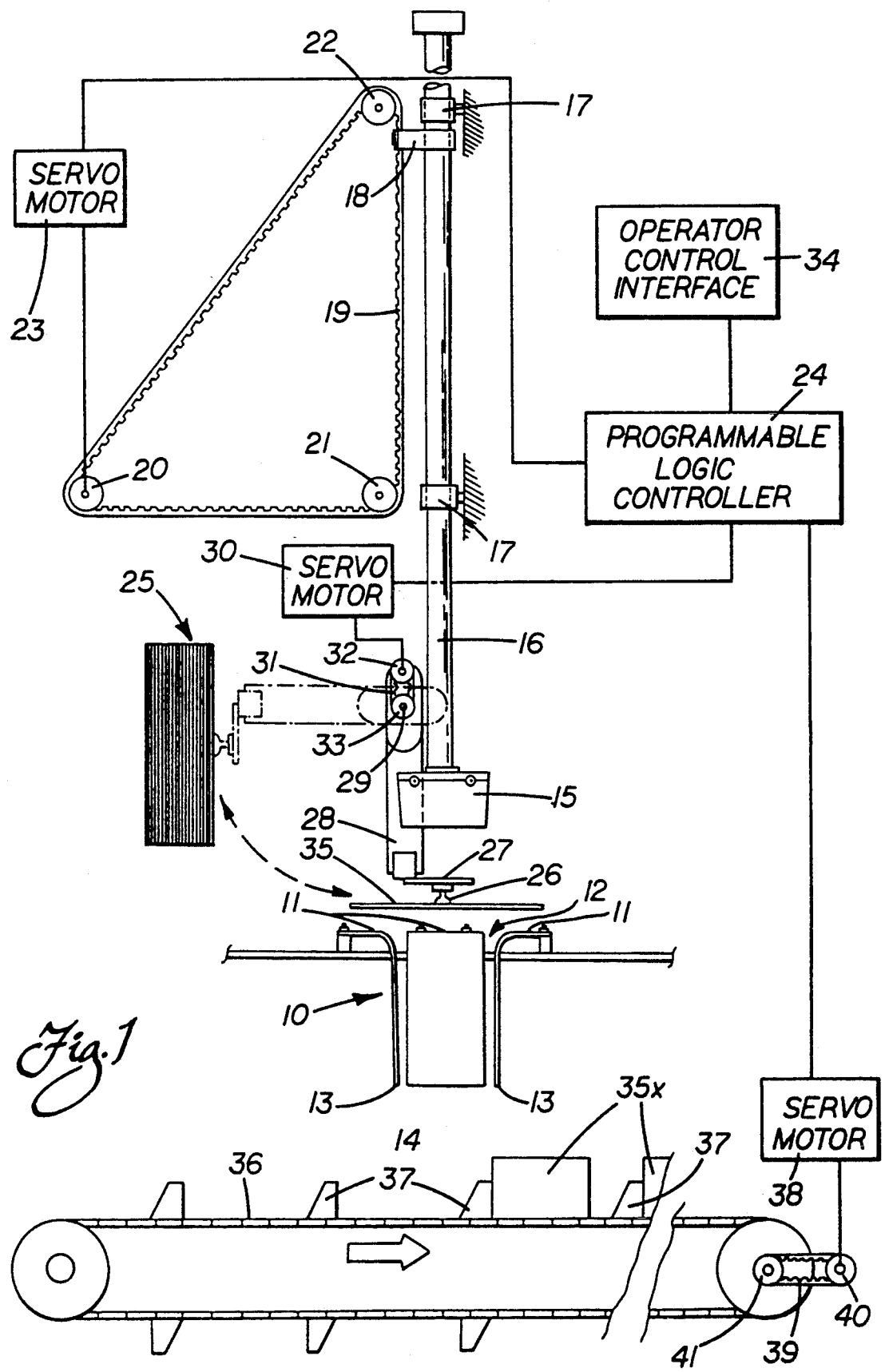
FIG. 1 is a side elevation showing a carton blank having been extracted from the magazine and swung down into position over the forming die.
Figure 2:
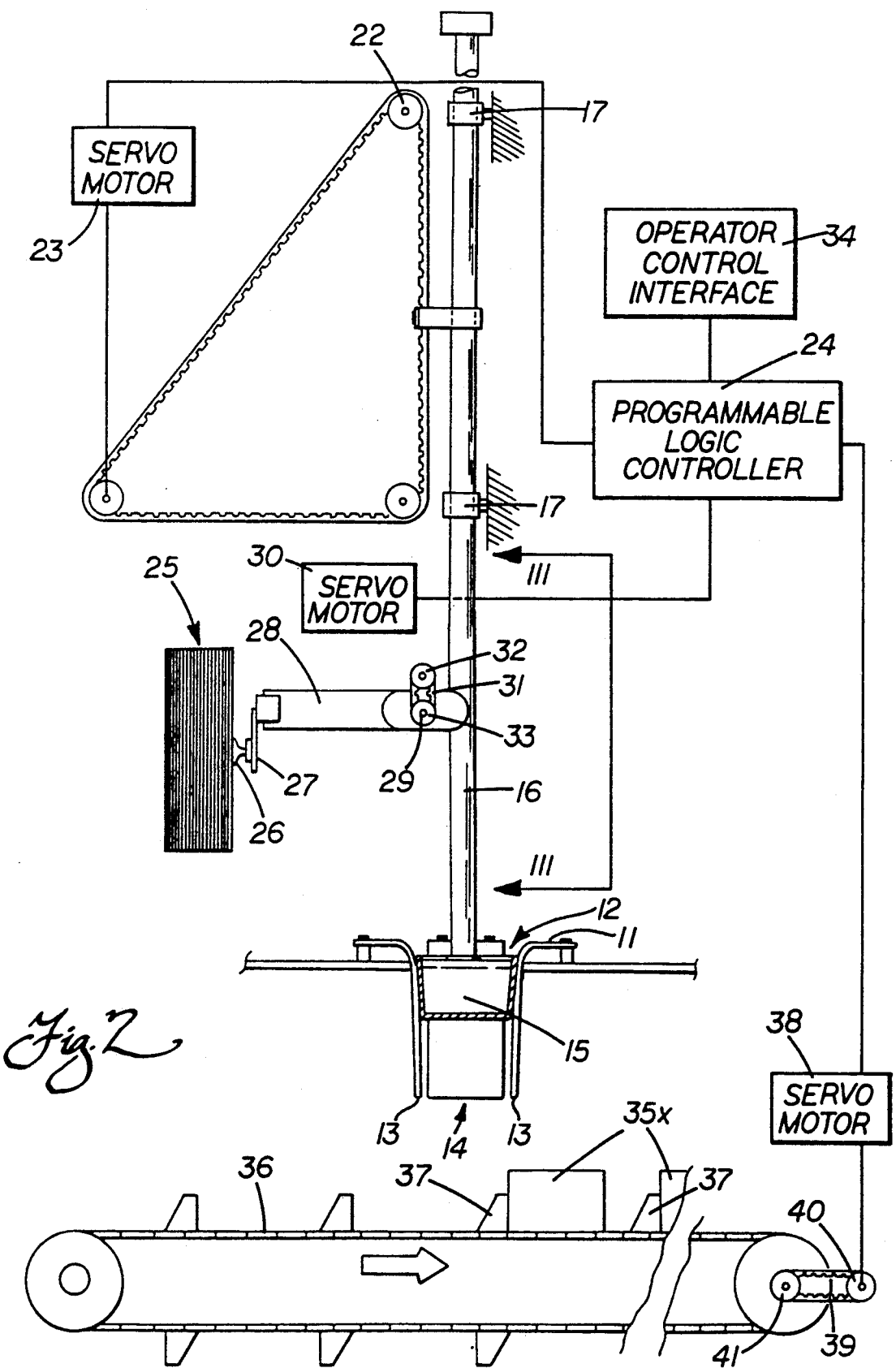
FIG. 2 corresponds to FIG. 1 but shows the plunger pushing the carton blank through the forming die.

In FIGS. 1 and 2, a forming die 10 has carton blank supporting surfaces 11 adjacent an upper entry end 12, and carton stripping means 13 at a lower exit end 14.

A plunger 15 is carried by the lower end of a vertical shaft 16 slidably but non-rotatably mounted in a pair of spaced guides 17 for reciprocation through the forming die 10, a lateral arm 18 secured to the shaft intermediate the guides also being secured to a gear-belt 19 trained around sprockets 20, 21, 22, with the sprocket 20 horizontally offset from the sprocket 21 and driven by a standard electronic, infinitely variable speed servo motor 23 with an encoder/tachometer feedback and which is coupled to a programmable logic controller 24 (see also FIG. 4).

Referring to FIGS. 1-3, carton blank feeder means comprises a magazine 25 for flat carton blanks, a pair of suction cups 26 carried by a frame 27 on an arm 28 secured on a horizontal shaft 29 enabling the suction cups to be swung from a position at the magazine (as shown in chain-dotted lines in FIG. 1 and in full line in FIG. 2) to a position (shown in full line in FIG. 1) just above the forming die 10, and a servo motor 30 for oscillating the shaft 29 through a gear-belt 31 and sprockets 32, 33; the servo motor 30 also being coupled to the programmable logic controller 24, for infinitely variable control to enable the timing and extent of swing of the suction cups 26 to be optimized.

The logic controller 24 can be programmed, as by input means including a control and display panel, preferably including a keyboard and CRT display (not shown), forming an operator control interface 34 provided for the controller, so that the servo motor 23 effects an infinitely variable movement, such as a rapid approach of the plunger 15 to a carton blank 35 on the supporting surfaces 11 of the forming die 10, then effects a rapid slowing of the plunger before contact with the carton blank, speeds up again as entry into the forming die proceeds (as shown in FIG. 2), maybe effecting a temporary stop or "hold" of formed carton 35X in the forming die 10 to set its folds, and effects a very fast return of the plunger 15 (after stripping of the formed carton from the plunger by the stripping means 13) to bring the plunger back far enough above the forming die for feeding of the next carton blank from the magazine 25 to the forming die 10.

Each formed carton 35X falls on to a conveyor 36 having propelling flights 37 and driven by a servo motor 38 through a gear-belt 39 and sprockets 40, 41, the servo motor 38 also being coupled to the programmable logic controller 24, to enable the infinitely variable timing of the flights 37 past the lower exit end 14 of the forming die 10 to be coordinated with the stripping of formed cartons 35X from the plunger 15.

The controller 24 preferably includes a microprocessor, such as an STD compatible 16 bit base computer, Cubit Model 8600 with a servo motor controller card, such as a Tech 80, Model 4322 and amplifier, such as Imec 400. The preferred compatible servo motor may be a Pacific Scientific RA6 SENA-TD-ED-NV-02. As configured, the circuit is capable of controlling all functions and repeating all movements required for any desired plunger movement pattern and/or carton size that is entered into the memory through the keyboard of the control interface 34. By providing a central controller 24 as described, there can be full coordination between all functions of blank feeding and plunger 15 operation; as well as, control of the conveyor 36.

To provide a fuller description of the operation of the product/carton sensing functions of the present invention, reference should now be made to FIG. 4. The product delivery means 50, which may be fed by several product processing machines (not shown) is controlled by logic controller 24. The product sensor means 52, such as a photoelectric unit or a proximity unit (infrared detector), detects product availability along the delivery means 50 in readiness for the next in-line carton 35X and times the product into said carton. In the event the next in-line carton 35X is missing, a similar carton sensor means 54 feeds a signal to the controller 24 to withhold product being delivered by the delivery means 50. When product is unavailable for delivery to a finished carton 53X, as determined by the sensor means 52, the blank feeding means is interrupted. According to these features, product is not only properly timed with the cartons 53X, but cartons are advantageously not formed and wasted when product is unavailable for filling. If a carton 53X is formed, but removed from the conveyor 36 before reaching the product delivery means 50, the product is withheld to prevent spillage.

The outstanding results and advantages of the present combination invention over the prior art cited should now be apparent. The carton forming apparatus, and related control circuit (see FIG. 4), extends the capability of such forming operations by increased speed and better carton control, as well as higher efficiency. The servo motors 23, 30, 38 are precisely controlled by signals generated from programmed data supplied to the programmable index controller 24 indicative of the particular requirements for carton forming. These controlled movements are further precisely coordinated with the product delivery. The use of servo motors eliminates a substantial number of mechanical actuators and linkage providing attractive manufacturing cost savings. Furthermore, efficiency and reliability are enhanced since the servo motors are very energy efficient and rugged in design.

Utilization of the servo motor 23 for driving the plunger 15 is of special significance to allow programmed control of the carton forming function. By specifying the interval speed, acceleration and position of the plunger, better timing and control of the blank and improved forming of the carton is attained. This precise movement pattern of the plunger helps to insure exactly the correct speed/acceleration profile at each point in the cycle. Controlling of all motors 23, 30, 38 by the same programmable index controller 24 adds an additional significant step to reach the optimum speed and efficiency of the overall carton forming and packaging operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. It is intended that the scope of the invention be defined by the claims appended hereto.

We claim:

1. An apparatus for forming cartons from flat paperboard blanks comprising:
   a die for receiving the blank;
   a reciprocating plunger to push said blank through said die to form said carton;
   servo drive means including a variable speed electric motor for said plunger; and
   programmable control means for operating said servo drive means;
   whereby the full operating motion of said plunger can be infinitely varied to fit the forming action desired.

2. The forming apparatus for cartons of claim 1 further comprising:
   feeder means for feeding said blanks to the face of said die;
   additional servo drive means including a variable speed electric motor for said feeder means; and
   said programmable control means operating said additional servo drive means;
   whereby the full operating motion of said feeder means can be infinitely varied to fit the forming action desired.

3. The forming apparatus for cartons of claim 1 further comprising:
   conveyor means for receiving the cartons for additional processing;
   additional servo drive means including a variable speed electric motor for said conveyor means; and
   said programmable control means operating said additional servo drive means;
   whereby the full operating motion of said conveyor means can be infinitely varied to fit the forming action desired.

4. The forming apparatus for cartons of claim 1 wherein said electric motor of the first mentioned servo drive means comprises a variable speed, electronic servo motor and said control means includes an electronic programmable logic controller.

5. The forming apparatus for cartons of claim 2 wherein said electric motor of the additional servo drive means for said feeder means comprises a variable speed, electronic servo motor and said control means includes an electronic programmable logic controller.

6. The forming apparatus for cartons of claim 3 wherein said electric motor of the additional servo drive means for said conveyor means comprises a variable speed, electronic servo motor and said control means includes an electronic programmable logic controller.

7. The forming apparatus for cartons to receive product from delivery means of claim 1 wherein is further provided product sensor means for detecting product availability for said carton, said programmable control means being operative to time the product into said carton.

8. The forming apparatus for cartons to receive product from delivery means of claim 7 wherein is further provided carton sensor means for detecting the availability of a formed carton on a conveyor means and for withholding product when a carton is missing.

9. The forming apparatus for cartons to receive product from delivery means of claim 1 wherein is further provided product sensor means for detecting product availability for said carton, said programmable control means being operative to interrupt said blank feeding means when product is unavailable for delivery into said carton.

10. The forming apparatus for cartons of claim 1 further comprising:
    an operator control interface for setting and displaying the control parameters of said programmable control means.

* * * * *